Patented Sept. 19, 1933

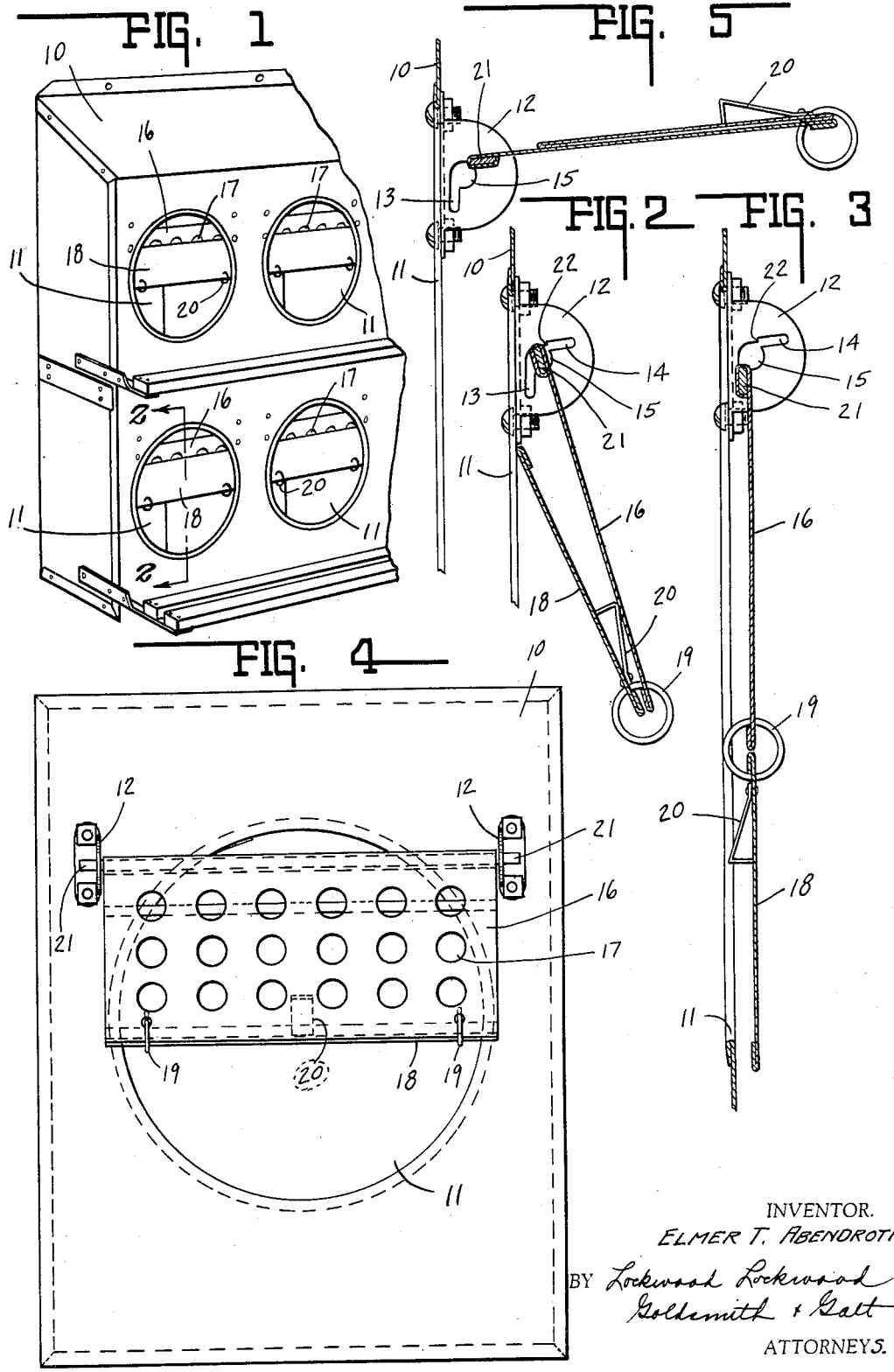

1,927,009

UNITED STATES PATENT OFFICE 1,927,009

TRAP FRONT FOR HEN LAYING NESTS

Elmer T. Abendroth, Tipton, Ind., assignor to The Oakes Manufacturing Company, Inc., Tipton, Ind.

Application November 16, 1931
Serial No. 575,199

8 Claims. (Cl. 119—49)

This invention relates to a trap for nesting hens adapted to be positioned in front of the nest through which the hen must enter for trapping her therein.

One feature of the invention resides in the construction and mounting of the trap door with respect to the passageway or opening for permitting ready release thereof to the trapping position, by a simple construction economical of manufacture so positioned as to avoid being rendered inoperative through accumulation of straw, grain or the like in the working parts thereof.

Another feature of the invention resides in the arrangement and mounting of the door for locking it against ingress of other hens after it has been operated, thus preventing a second hen from entering the nest, without being rendered inoperative through interference of grain, straw or the like as above mentioned.

A further feature of the invention resides in the arrangement of the support for the door for permitting of the above actions while allowing it to be readily manipulated to continuously remain open for providing an open nest without the necessity of removing the door.

The full nature of the invention will be understood from the accompanying drawing and the following description and claims:

Fig. 1 is a perspective view of a group of nests showing the door in position for entry of the nesting hen. Fig. 2 is a section taken on the line 2—2 of Fig. 1, showing an enlarged view thereof. Fig. 3 is the same as Fig. 2 showing the door in trapping position. Fig. 4 is a rear elevation showing the door in trapping position. Fig. 5 is the same as Fig. 2 showing the door in position for an open nest.

In the drawing there is shown a housing 10 for providing a plurality of nests having openings or entries 11 therein. Secured to the rear side of the front panel of the housing and above the opening 11, there are a pair of ears 12 provided with openings therein comprising the vertical or downwardly extending slot 13, the rearwardly extending of horizontal slot 14, and intermediate circular opening 15. Said ears are adapted to support the trap door as hereinafter described.

The trap door is comprised of two separate sheet metal sections. The upper section 16 is provided with a plurality of perforations or air vents 17. The lower section 18 is loosely swung therefrom by the rings 19. Thus, when the sections are in vertical position with the lower section swinging downwardly from the upper section, the opening 11 is substantially closed. The lower section is provided with a projection 20 intermediate its ends and adjacent the upper edge thereof, said projection extending from the forward face thereof, as illustrated in Fig. 3. The top edge of the upper section is secured to a supporting bar 21 having its free ends protruding beyond the side edges of the door and extending into the openings in the ears 12. Said bar is so formed as to readily turn within the circular opening 15, and to slide in and out of the slotted portions thereof, 13 and 14.

In operation, before the hen enters the nest, the door is raised so that the projecting ends of the bar 21 ride and turn in the opening 15 so that the door readily swings rearwardly from the opening in the front panel. The lower section is then swung upwardly in front of the upper section so that the lower edge thereof bears against the rear face of the panel as indicated in Fig. 2. The door sections are thus held in spaced position to each other and the front panel by the projection 20. In this position the hen may enter, striking the depending edges of the sections and forcing them upwardly so that the bottom section may drop by gravity into the position shown in Fig. 3. Thus, the hen is trapped in the nest. At the same time, the ends of the bar 21 drop into the slot 13 so as to lock the upper section in closed position. With it so locked, a second hen cannot enter the nest from the outside. When it is desired to provide an open nest, the operator may grasp the lower section of the door, swinging it rearwardly and upwardly against the rear of the upper section, raise the bar 21 out of the slot 13, swing the sections to horizontal position and push the bar into the horizontal slot 14 as illustrated in Fig. 5. In this position, the sections are held together horizontally above the opening 11 so as to permit of free access to and from the nest.

In order that the door may not jar or be knocked in position to drop, the upper slot is provided with a shoulder 22 against which the ends of the rod 21 engage when in the horizontal slot so as to prevent lateral movement unless the door is slightly lifted to cause disengagement of said shoulder.

From the foregoing, it will be noted that the construction is most simple and positive in its operation, the slots which control the various positions of the door being adjacent the top of the nest so as to be free from accumulations of straw, grain or the like.

The invention claimed is:

1. The combination with a hen nest or the like having an opening in the wall thereof, of a trap door therefor, said door comprising an upper and lower section hingedly connected with each other, a support for said door adjacent the upper portion of said opening, and means adjacent the top edge of the upper section of said door for engaging the said support to permit free swinging movement of said door when in one position while locking the upper section of said door to close said opening when in another position, said means being adapted to support said door substantially horizontally away from the opening when in a third position with respect to said support.

2. The combination with a hen nest or the like having an opening in the wall thereof, of a trap door therefor, a support for said door adjacent the upper portion of said opening, said support being provided with an opening therein having a recess, a projection on said door extending into said opening and adapted to turn therein for permitting swinging movement of said door when said door extends at an angle to said wall and to engage in said recess for locking said door against swinging movement when dropped against said wall, and a second recess communicating with said opening in which said projection is adapted to engage when the door is swung to horizontal position for locking it away from said opening.

3. The combination with a hen nest or the like having an opening in the wall thereof, of a trap door therefor comprising an upper section and a lower section hingedly connected with each other, a pair of ears extending rearwardly from said wall adjacent the opening therein, said ears being provided with vertical and horizontal recesses connecting with a substantially annular opening, and a supporting member formed adjacent the top edge of the upper section adapted to extend through each of the said ears and ride in the circular opening for permitting swinging movement of the door when extending at an angle to the wall, said member being adapted to drop into the downwardly extending recess for locking the door in closing position and be moved into the horizontally extending recess for locking the door in open position.

4. The combination with a hen nest or the like having an opening in the wall thereof, of a trap door therefor, comprising an upper and lower section, means for pivotally connecting the lower section to the upper section so as to swing free therefrom, means for pivotally supporting the upper section from said wall, and means for maintaining said sections at an angle to each other and said wall upon the lower section being folded upwardly between the wall and upper section.

5. The combination with a hen nest or the like having an opening in the wall thereof, of a trap door therefor comprising an upper and lower section, a support for said door provided with an opening therein having a recess, a member on said door extending into said opening and adapted to turn therein for permitting swinging movement thereof, a projection on one of the sections of said door for maintaining said sections in spaced relation and at an angle to said wall when the lower section is folded upwardly between the upper section and wall whereby said door may be swung on said support to permit the lower section to drop downwardly in alignment with the upper section, and means for locking said upper section against swinging movement when the lower section is dropped downwardly and suspended therefrom.

6. The combination with a hen nest or the like having an opening in the wall thereof, of a trap door therefor comprising an upper and lower section, a support for said door provided with an opening therein having a recess, a member on said door extending into said opening and adapted to turn therein for permitting swinging movement thereof, a projection on one of the sections of said door for maintaining said sections in spaced relation and at an angle to said wall when the lower section is folded upwardly between the upper section and wall whereby said door may be swung on said support to permit the lower section to drop downwardly in alignment with the upper section, means for locking said upper section against swinging movement when the lower section is dropped downwardly and suspended therefrom, and means for locking said door in horizontal position so as to remain open.

7. The combination with a hen nest or the like having an opening in the wall section thereof, of a trap door section therefor, means for supporting said door section on the wall section, said means comprising projections extending from one of said sections and a member secured on the other section, said member being provided with an opening therein having a recess for receiving and supporting said projection, and a second recess in said member in which said projection is adapted to be moved for locking the door section when moved to substantially horizontal open position.

8. The combination with a hen nest or the like having an opening in the wall thereof, of a trap door therefor, said door comprising an upper and lower section hingedly connected with each other, a support for said door adjacent the upper portion of said opening, and means adjacent the top edge of the upper section of said door for engaging the said support to permit free swinging movement of said door when in one position while locking the upper section of said door to close said opening when in another position.

ELMER T. ABENDROTH.